United States Patent
Gallhuber et al.

(10) Patent No.: US 10,060,376 B2
(45) Date of Patent: Aug. 28, 2018

(54) METHOD AND DEVICE FOR DETECTING AUTO-IGNITIONS IN A SPARK IGNITION INTERNAL COMBUSTION ENGINE

(71) Applicant: CONTINENTAL AUTOMOTIVE GMBH, Hannover (DE)

(72) Inventors: Andreas Gallhuber, Regensburg (DE); Dominik Biehl, Alteglofsheim (DE); Markus Kieberger, Regensburg (DE)

(73) Assignee: Continental Automotive GmbH, Munich (DE)

( * ) Notice: Subject to any disclaimer, the term of this patent is extended or adjusted under 35 U.S.C. 154(b) by 0 days.

(21) Appl. No.: 15/625,099

(22) Filed: Jun. 16, 2017

(65) Prior Publication Data

US 2017/0284328 A1 Oct. 5, 2017

Related U.S. Application Data

(63) Continuation of application No. PCT/EP2015/075773, filed on Nov. 5, 2015.

(30) Foreign Application Priority Data

Dec. 22, 2014 (DE) .......................... 10 2014 226 757

(51) Int. Cl.
 *F02P 5/00* (2006.01)
 *F02D 41/22* (2006.01)
 (Continued)

(52) U.S. Cl.
 CPC ............ *F02D 41/22* (2013.01); *F02B 37/183* (2013.01); *F02D 9/10* (2013.01); *F02D 41/0087* (2013.01);
 (Continued)

(58) Field of Classification Search
 CPC ... F02D 37/02; F02P 5/00; F02P 5/145; F02P 5/1526; F02P 5/151
 (Continued)

(56) References Cited

U.S. PATENT DOCUMENTS 4,527,526 A * 7/1985 Akasu .................. F02P 5/1521
 123/406.21
5,337,536 A 8/1994 Takahashi et al.
 (Continued)

FOREIGN PATENT DOCUMENTS

DE 19859310 A1 6/2000
DE 102004044690 A1 4/2005
 (Continued)

OTHER PUBLICATIONS

German Office Action dated Aug. 20, 2015 for corresponding German Patent Application No. 10 2014226757.9.
 (Continued)

*Primary Examiner* — John Kwon

(57) ABSTRACT

In a spark-ignition internal combustion engine having multiple cylinders, successive segment time periods assigned to the individual cylinders during working strokes thereof, and subsequently irregular running values are determined from the segment time periods. In a predefined speed range of the engine, the irregular running values of the cylinders are compared with a predefined threshold, and suspected auto-ignition for a first cylinder is detected if the irregular running value of a second cylinder located before the first cylinder in terms of timing of the ignition sequence undershoots the threshold. Fuel to the first cylinder suspected of auto-ignition is interrupted for a predefined number of cycles, and the fuel interruption influence on the irregular running values of the second cylinder during the cycles is detected. The suspected auto-ignition of the first cylinder is either
 (Continued)

confirmed or rejected based on the irregular running values occurring at the second cylinder.

14 Claims, 4 Drawing Sheets

(51) Int. Cl.
  *F02D 41/26* (2006.01)
  *F02D 41/30* (2006.01)
  *F02D 41/00* (2006.01)
  *F02D 9/10* (2006.01)
  *F02B 37/18* (2006.01)
(52) U.S. Cl.
  CPC ......... *F02D 41/26* (2013.01); *F02D 41/3005* (2013.01); *F02D 2200/021* (2013.01)
(58) Field of Classification Search
  USPC ............. 123/406.11–406.13, 406.16, 406.18, 123/406.19, 406.2, 406.21, 406.24, 123/406.29, 406.35, 406.37, 406.39; 701/103–105, 110, 111, 114
  See application file for complete search history.

(56) References Cited

U.S. PATENT DOCUMENTS

| | | | |
|---|---|---|---|
| 5,505,087 A | 4/1996 | Angermaier et al. | |
| 5,566,090 A | 10/1996 | Angermaier et al. | |
| 7,861,689 B2 | 1/2011 | Huag et al. | |
| 2005/0056254 A1 | 3/2005 | Wozniak et al. | |
| 2008/0201061 A1 | 8/2008 | Fach et al. | |
| 2012/0310505 A1 | 12/2012 | Morgan et al. | |
| 2014/0032084 A1* | 1/2014 | Gehrke | F02D 41/062 701/105 |
| 2015/0316020 A1 | 11/2015 | Schuele et al. | |
| 2016/0369735 A1* | 12/2016 | Zhou | F01N 13/14 |

FOREIGN PATENT DOCUMENTS

| | | |
|---|---|---|
| DE | 102005046956 B3 | 6/2007 |
| DE | 102007007815 A1 | 8/2008 |
| DE | 102007024415 B3 | 1/2009 |
| DE | 102012208824 A1 | 12/2012 |
| DE | 102012221249 B3 | 3/2014 |
| EP | 0576705 A1 | 1/1994 |
| EP | 0583496 A1 | 2/1994 |
| EP | 0622542 A1 | 11/1994 |
| EP | 0818683 A2 | 1/1998 |

OTHER PUBLICATIONS

International Search Report and Written Opinion dated Mar. 1, 2016 for corresponding International Patent Application No. PCT/EP2015/075773.

International Preliminary Report on Patentability dated Jun. 27, 2017 for corresponding International Patent Application No. PCT/EP2015/075773.

* cited by examiner

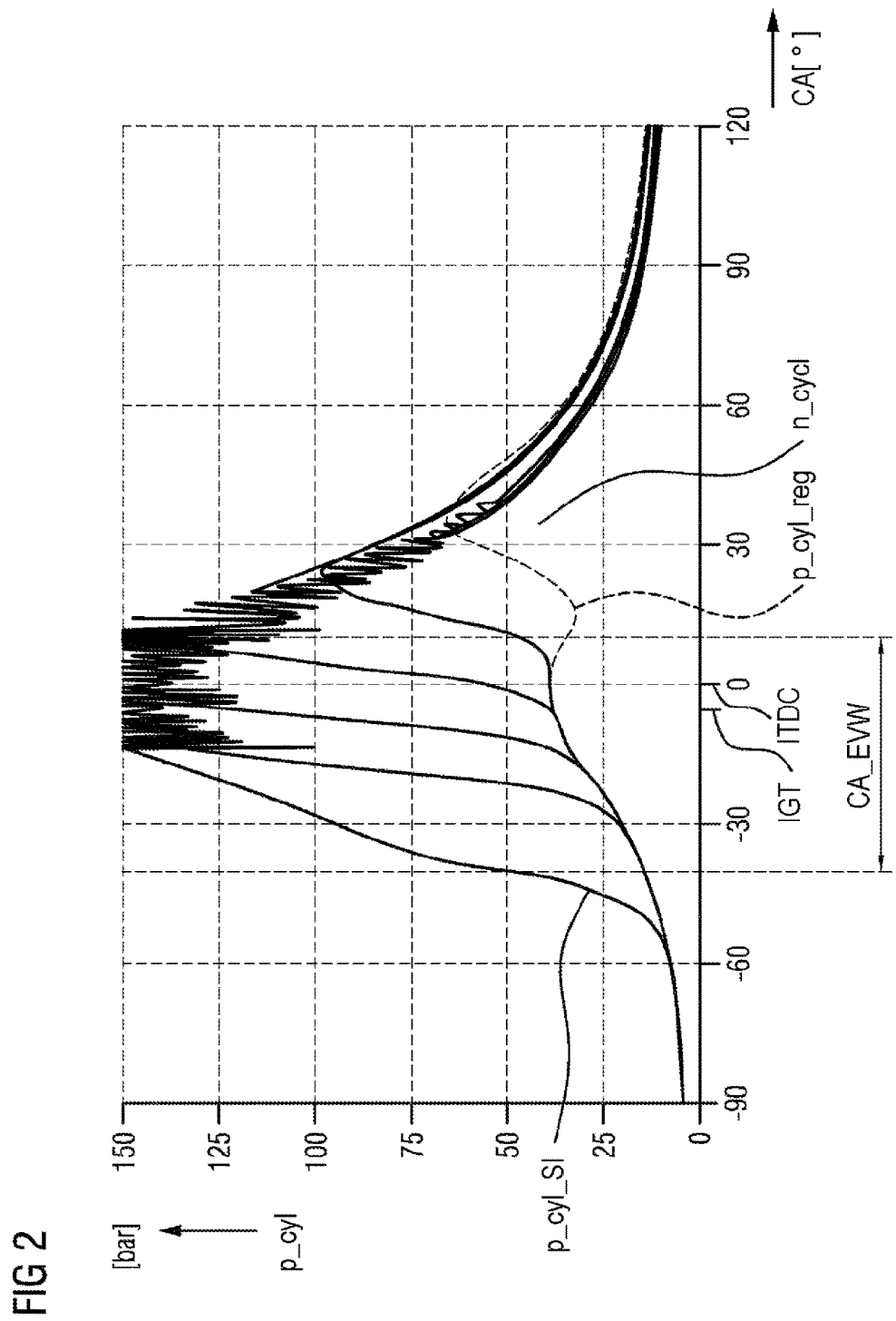

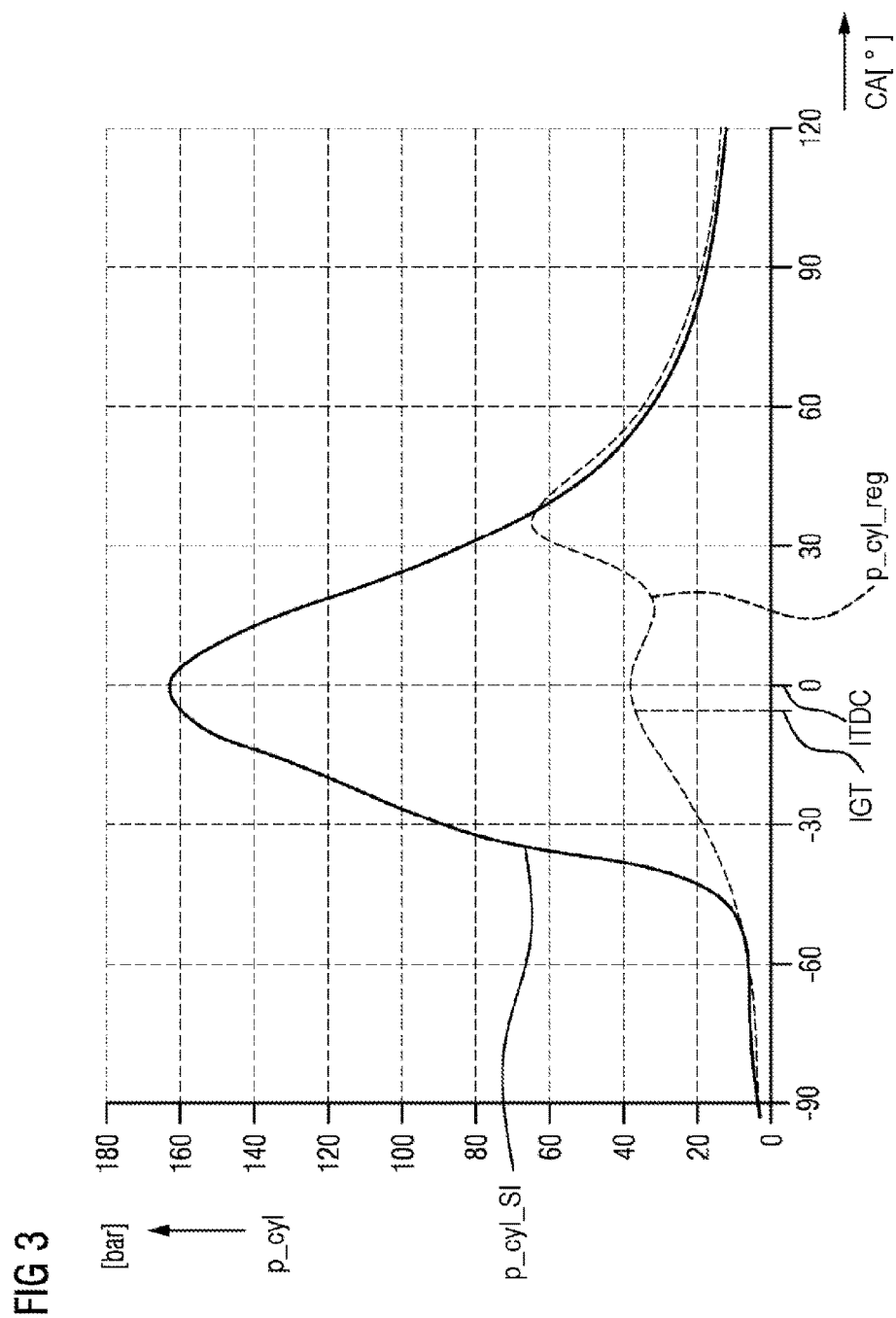

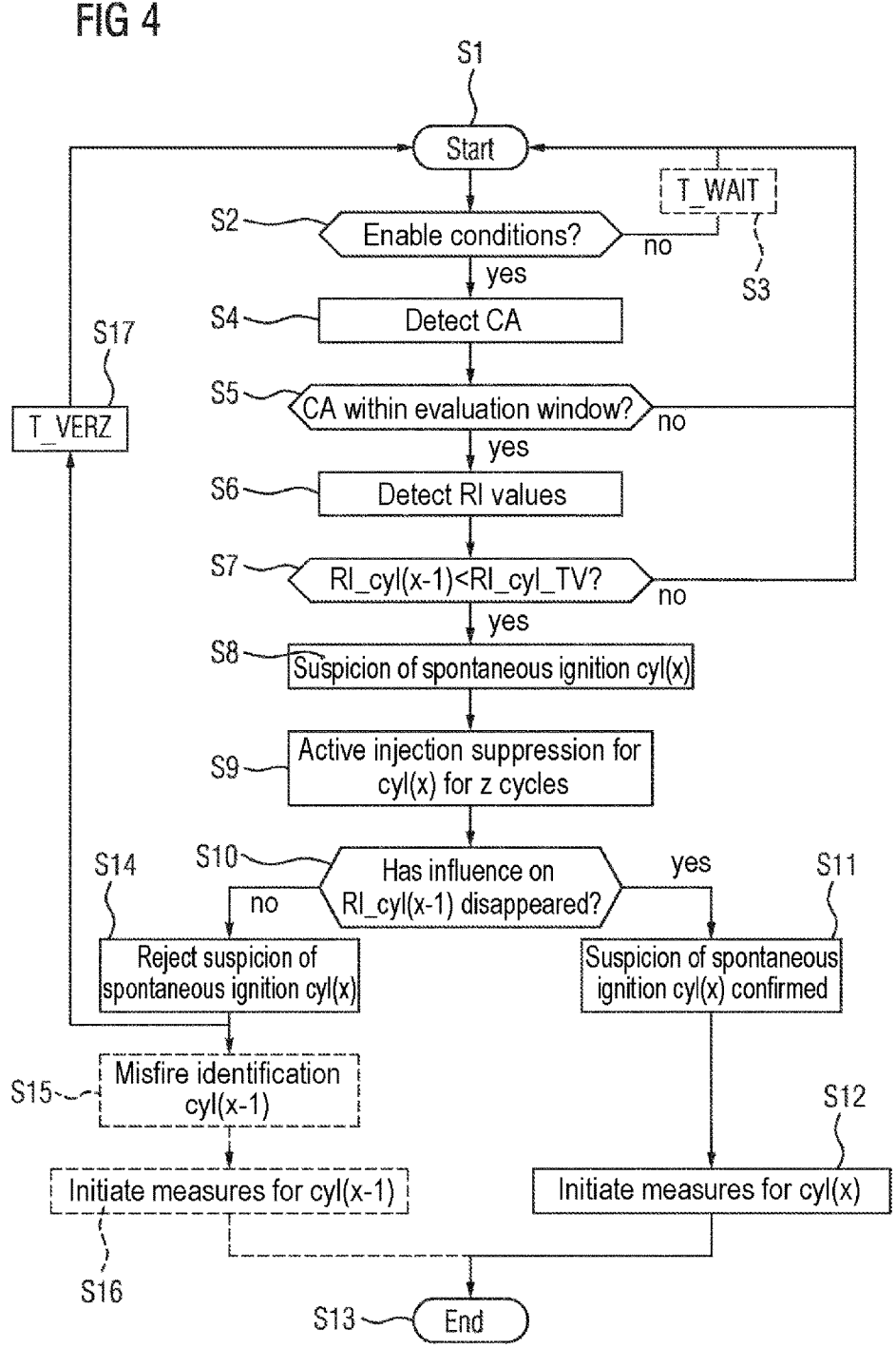

METHOD AND DEVICE FOR DETECTING AUTO-IGNITIONS IN A SPARK IGNITION INTERNAL COMBUSTION ENGINE

CROSS REFERENCE TO RELATED APPLICATIONS

This application claims the benefit of PCT Application PCT/EP2015/075773, filed Nov. 5, 2015, which claims priority to German Application DE 10 2014 226 757.9, filed Dec. 22, 2014. The contents of the above applications are incorporated herein by reference.

FIELD OF INVENTION

The invention relates to a method and to a device for identifying spontaneous ignitions in an applied-ignition internal combustion engine.

BACKGROUND

In modern, highly supercharged Otto-cycle internal combustion engines, the phenomena of premature firing and spontaneous ignition are increasingly encountered with increasing charge and peak pressures. These phenomena occur primarily at high loads throughout the engine speed range and are distinguished by uncontrolled spontaneous firing of the fuel-air mixture in the combustion chamber at a time before the spark ignition by means of the ignition plug. The result is uncontrolled firing and combustion with extreme peak pressures, very high combustion temperatures, high pressure amplitudes and thus a damaging action.

Whereas premature firing normally occurs as a stochastic individual event owing to incandescent residual particles remaining in the combustion chamber and disappears again after a certain number of working cycles, spontaneous ignitions are self-intensifying processes of irregular combustion prior to the regular ignition time. Triggers here are hot surfaces and superheated components such as, for example, electrodes of ignition plugs, outlet valves, sharp superheated edges in the combustion chamber, or soot and fuel deposits on hot combustion chamber walls. Spontaneous firing occurring at an early time causes the pressure and the temperature in the combustion chamber to increase even further, and the triggering component or the surface is heated yet further. During the next cycle, the spontaneous ignition occurs even earlier, and the combustion chamber temperature increases further. In the end phase, in which the spontaneous ignition reaches its steady state, the self-ignition time is so early that knocking can no longer be identified. The spontaneous ignition cannot be prevented by retarding the ignition angle.

The high thermal load of the combustion chamber can result in damage or even total destruction of the piston, or in melting of the electrodes of the ignition plug or of parts of the highly loaded outlet valves. To prevent damage to the internal combustion engine, early identification of such spontaneous ignitions is necessary.

DE 10 2007 024 415 B3 describes a method for the identification of a spontaneous ignition of an applied-ignition internal combustion engine having at least one cylinder, which is connected to a crankshaft. In the method, a rotational speed of the crankshaft is measured during a compression stroke of the cylinder during a first time interval in the working cycle of the internal combustion engine. Furthermore, a knocking signal is detected during a working stroke of the cylinder during a second time interval in the working cycle of the internal combustion engine. Spontaneous ignition of the cylinder is identified if the rotational speed of the crankshaft is slowed in relation to a comparative value and knocking combustion is identified on the basis of the knocking signal.

DE 10 2012 221 249 B3 presents a method and a device for identification of a spontaneous ignition in an applied-ignition internal combustion engine having at least one cylinder which, together with a piston, delimits a combustion chamber, having a combustion chamber pressure sensor for measuring the pressure in the combustion chamber, having a crankshaft angle sensor which outputs a signal representative of the crankshaft angle, and having a control device for the control and/or regulation of the internal combustion engine. During a compression stroke of the internal combustion engine, values for the combustion chamber pressure are detected at defined crankshaft angles within an evaluation window, a filtered pressure value is determined from the detected values for the combustion chamber pressure, and theoretical pressure values in the combustion chamber, such as would arise if no combustion were to take place in the combustion chamber, are determined at the defined crankshaft angles. The value of the pressure difference between the filtered pressure value and the theoretical pressure values is formed, the value of the pressure difference is compared with a predefined threshold value, and in the event of the threshold value being exceeded, a spontaneous ignition in the combustion chamber is inferred.

From DE 198 59 310 A1, it is known for premature firing events to be identified through detection of the ion flow, wherein here, the use of a regulation loop is described in which operating parameters of the internal combustion engine are regulated by means of the engine controller on the basis of identified premature firing events. It is proposed that, in the event of the measured ion flow exceeding a threshold value, the ignition angle be shifted in regulated fashion toward later ignition times, and a preset ignition angle be reverted to again after elimination of the premature firing.

SUMMARY

The object on which the invention is based includes providing a method and a device which permit reliable identification of spontaneous ignitions during the operation of an applied-ignition internal combustion engine.

Embodiments of the invention are directed to a method and a device for identifying a spontaneous ignition in an applied-ignition internal combustion engine with multiple cylinders by measuring successive segment time periods which are assigned to the individual cylinders and which are required by the crankshaft to pass through predefined angle ranges during the working strokes of the cylinders, and subsequently determining running irregularity values from the segment time periods. In a predefined load/engine speed range of the internal combustion engine, the running irregularity values of all of the cylinders are compared with a predefined threshold value, and a suspicion of spontaneous ignition for a cylinder is identified if the running irregularity value of a cylinder which precedes the cylinder in time in the ignition sequence falls below the threshold value. The fuel supply to the cylinder suspected of spontaneous ignition is interrupted for a predefined number of cycles, and the influence of the interruption of fuel to the cylinder on the running irregularity values of the cylinder during the cycles is detected. The suspicion of spontaneous ignition for the cylinder is either confirmed or rejected depending on the occurring running irregularity values of the cylinder.

By means of the method according to the embodiments, it is possible in a simple and inexpensive manner for spontaneous ignitions that occur to be identified and to be reliably distinguished from misfires. In this way, it is possible for components in the combustion chamber of the internal combustion engine to be protected in an effective manner against thermal overloading without the need to rely on a signal from a knocking sensor.

The method has the advantage that it is in particular suitable for identifying a very rapid or immediate change-over of the combustion characteristic to a smooth cylinder pressure profile with very early firing and a combustion center of gravity before top dead center. It is thus possible for hitherto undiscovered events that can lead to damage to the internal combustion engine to be identified at an early point in time and for measures for lowering the combustion chamber temperature to be initiated in good time. Here, what is important is a differentiation between a misfire of the logically preceding cylinder and braking of the crank drive owing to a very early spontaneous ignition of the cylinder presently under consideration.

An effective lowering of the combustion chamber temperature in the event of a spontaneous ignition being identified can be achieved through initiation of at least one of the following measures:
setting of a rich air-fuel mixture,
reducing the load of the internal combustion engine,
at least partially closing a throttle flap arranged in an intake tract of the internal combustion engine,
selectively deactivating the fuel supply to the cylinder, and
opening a wastegate in the case of a supercharged internal combustion engine.

BRIEF DESCRIPTION OF THE DRAWINGS

Further advantages and embodiments of the invention will emerge from the following description and drawing of an exemplary embodiment, in which:

FIGS. 2 and 3 show diagrams with different pressure profiles in a combustion chamber of an applied-ignition internal combustion engine as a function of the crankshaft angle, and FIG. 4 is a flow diagram of a program for identifying spontaneous ignitions in an applied-ignition internal combustion engine.

DETAILED DESCRIPTION

Figure 1:
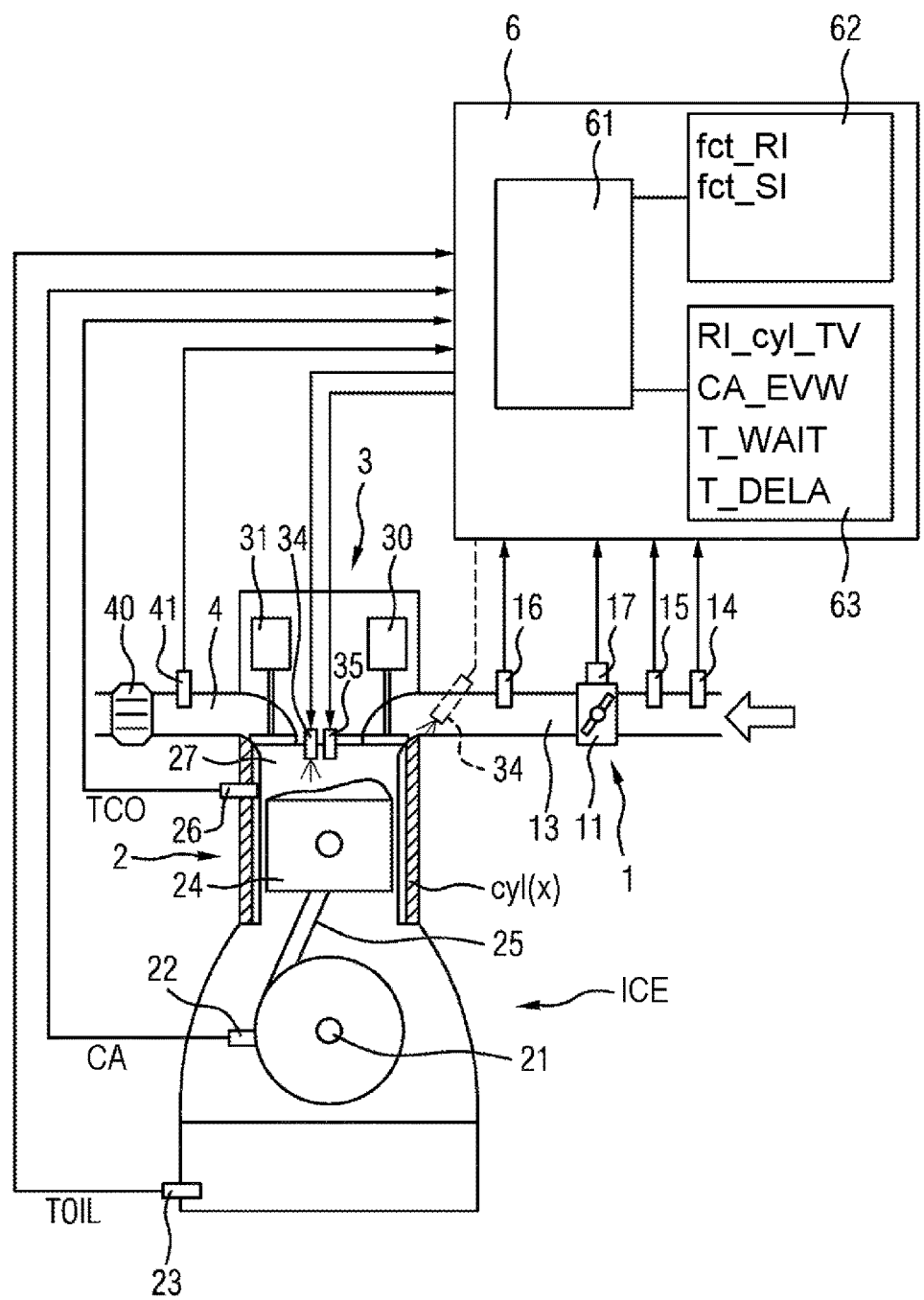
FIG. 1 is a schematic illustration of an applied-ignition internal combustion engine with an associated control device.

The internal combustion engine ICE (FIG. 1) includes an intake tract 1, an engine block 2, a cylinder head 3, and an exhaust-gas tract 4. The intake tract 1 includes a throttle flap 11, and furthermore an intake pipe 13 which leads to a cylinder cyl(x) via an inlet duct into the engine block 2. The engine block 2 includes a crankshaft 21 which is coupled via a connecting rod 25 to a piston 24 of the cylinder cyl(x). The cylinder cyl(x) and the piston 24 delimit a combustion chamber 27. In FIG. 1, for the sake of clarity, only a single cylinder cyl(x) is shown, though the internal combustion engine ICE has at least 2 cylinders, and preferably 3-8 cylinders.

The cylinder head 3 includes a valve drive with a gas inlet valve 30, a gas outlet valve 31 and corresponding valve drives (not shown in any more detail). The cylinder head 3 furthermore includes an ignition plug 35 and an injection valve 34. Alternatively, the injection valve 34 may also be arranged in the intake tract 1, as is shown in FIG. 1 in dashed lines.

The exhaust-gas tract 4 includes an exhaust-gas catalytic converter 40, which is in the form of a three-way catalytic converter. An exhaust-gas probe 41 is arranged upstream of the exhaust-gas catalytic converter 40.

A control device 6 is provided, which is assigned sensors which detect different measurement variables and determine the measurement values of the measurement variables. Operating variables encompass not only the measurement variables but also variables derived therefrom. The actuation elements which are assigned to the internal combustion engine ICE and which are assigned in each case corresponding actuation drives are activated by the control device 6, as a function of at least one of the operating variables, through the generation of actuation signals for the actuation drives. The control device 6 may also be referred to as a device for the operation of the internal combustion engine, or simply as an engine control unit.

The sensors whose signals are supplied to the control device 6 are, inter alia, an air mass sensor 14, which detects an air mass flow upstream of the throttle flap 11; a temperature sensor 15, which detects an intake air temperature; a pressure sensor 16, which detects an intake pipe pressure; a throttle flap position sensor 17, which detects an opening angle of the throttle flap 11; a crankshaft angle sensor 22, which detects a crankshaft angle CA which is then assigned an engine speed N; a temperature sensor 23 which detects an oil temperature TOIL; a temperature sensor 26 which detects a coolant temperature TCO of the internal combustion engine ICE; and an exhaust-gas probe 41, which detects a residual oxygen content of the exhaust gas and the measurement signal of which is characteristic of the air-fuel ratio in the cylinder cyl(x) during the combustion of the air-fuel mixture. The exhaust-gas probe 41 may be in the form of a linear lambda probe and thus, over a broad relevant range of the air-fuel ratio, generates a measurement signal proportional thereto.

Depending on the configuration, it is possible for a subset of the stated sensors to be provided, or it is also possible for additional sensors to be provided.

The actuation elements are, for example, the throttle flap 11, the gas inlet valve 30, the gas outlet valve 31, the injection valve 34 and the ignition plug 35.

The control device 6 includes a computing unit (processor) 61, which is coupled to a program memory 62 and a value memory (data memory) 63. The computing unit 61, the program memory 62 and the value memory 63 may each include one or more microelectronic components. Alternatively, such components may be partially or entirely integrated in a single microelectronic component. In the program memory 61 and the value memory 63 there are stored programs and values which are required for the operation of the internal combustion engine ICE. In particular, a function fct_RI for the identification of misfires through evaluation of the running irregularity of the internal combustion engine and a function fct_SI for the identification of irregular combustions are implemented, which are executed by the computing unit 61 during the operation of the internal combustion engine ICE, as will be discussed in more detail on the basis of FIG. 4.

In the value memory 63 there are stored, inter alia, a starting and end value, expressed in crank angles, which define an evaluation window CA_EVW for the determination of spontaneous ignitions, and a threshold value RI_cyl_TV for running irregularity values RI_cyl(x), the meaning of which will likewise be discussed in more detail on the basis of FIG. 4. Values for a waiting time period T_WAIT and a delay time T_DELA are likewise stored.

FIG. 2 illustrates various profiles of the combustion chamber pressure p_cyl, often also referred to for simplicity as cylinder pressure, as a function of the crankshaft angle CA (in units of degrees). With the reference designation p_cyl_reg, a typical pressure profile such as is encountered during a regular combustion of the air-fuel mixture is shown. In this context, "regular" or "normal" combustion is to be understood to mean combustion initiated exclusively by an ignition spark of the ignition plug, and in the case of which no knocking, premature firing or spontaneous ignition occurs. The position of the ignition time is dependent on the load and the engine speed and is denoted by the reference designation IGT. In this exemplary embodiment, the ignition time lies approximately 5° CA (crankshaft angle) before ITDC (ignition top dead center). In the case of regular combustion, the peak pressure lies approximately 20° CA (crankshaft angle) after ITDC.

The reference designation p_cyl_SI denotes a combustion chamber pressure profile that arises during operation of the internal combustion engine ICE if irregular combustions occur. A spontaneous ignition develops over several cycles n_cycl, often proceeding from regular combustion via knocking combustion to repeating premature firing events, as indicated by the set of curves in FIG. 2. In the further profile, it is often the case that the changeover to a smooth cylinder pressure profile with a combustion center of gravity before ignition top dead center ITDC can be observed, as illustrated in FIG. 3.

The angle range denoted in FIG. 2 by the reference designation CA_EVW defines an evaluation window within which the identification of spontaneous ignitions is meaningful. In this example, the lower boundary of the evaluation window CA_EVW lies at −40° CA relative to ignition top dead center ITDC, and the upper boundary of the evaluation window CA_EVW lies at 10° CA likewise in relation to ignition top dead center ITDC.

Below, on the basis of FIG. 4 in the form of a flow diagram, the method for identifying spontaneous ignitions will be discussed in more detail.

In a step S1, the method is started, in which step, if necessary, variables are initialized and counter levels are reset. The first run-through of the method may be performed shortly after starting the internal combustion engine ICE, and may subsequently be invoked periodically at certain time intervals. In a step S2, it is queried whether certain enable conditions for the execution of the method for identifying spontaneous ignitions are met.

As already mentioned in the introduction, spontaneous ignition occurs only if temperatures of components in the combustion chamber, such as the ignition plug, parts of the outlet valve, the piston crown or squish edges in the cylinder head locally exceed the auto-ignition temperature of the injected fuel. Typical values for such temperatures lie at approximately 1100-1200° C., depending on the type and quality of the fuel. The method is thus to be performed if it is to be expected that such temperatures will be reached owing to the present operating point of the internal combustion engine. As an indication for this, it is possible for one or multiple of the parameters of coolant temperature TCO, oil temperature TOIL, running time of the internal combustion engine ICE since the most recent start, engine speed N, and load variables such as intake pipe pressure, air mass flow and throttle flap position be taken into consideration and compared with associated threshold values.

If the internal combustion engine ICE is operated, for example, at low load and engine speed, the enable conditions are not met, and, possibly after a predefinable waiting time period T_WAIT (step S3), the execution is resumed again in step S2.

Since the method according to the disclosed embodiments is based on the evaluation of running irregularity values which are obtained by measurement of successive time periods required by the crankshaft to pass through predefined angle ranges during the working strokes of the successive cylinders, it is necessary for external influences on the crankshaft rotational speed, such as for example feedback of road unevenness by the drivetrain, to be suppressed, because these can falsify both the result of a misfire identification function and the result of the spontaneous ignition identification function. Therefore, a further enable condition in step S2 is that no so-called rough road situation is present, otherwise the method for identifying spontaneous ignitions is suppressed, that is to say blocked, and the process branches back to step S1. Methods for identifying rough road situations, in the case of which the wheel movements of the motor vehicle, in particular the wheel accelerations occurring therein, are evaluated, are described, for example, in EP 0 818 683 B1 and EP 0 622 542 B1.

If, in step S2, the query yields that at least one of the threshold values mentioned in the introduction has been exceeded and no rough road situation is present, the method for identifying spontaneous ignitions is continued in a step S4.

The present value of the crankshaft angle CA is detected by means of the crankshaft angle sensor 22, and it is subsequently checked in a step S5 whether the value CA lies within the defined evaluation window CA_EVW (FIG. 2). If this is not the case, the process jumps back to step S1.

If the present crankshaft angle CA lies within the evaluation window CA_EVW, then in a step S6, running irregularity values RI_cyl(x) of the individual cylinders cyl(x) are detected. The detection is necessary only in a certain critical load/engine speed range of the internal combustion engine ICE. Such range, also referred to as load/engine speed window, is determined experimentally and is stored in the value memory 63 of the control device 6. The function fct_RI for the identification of misfires, which function is implemented in the program memory 62, is used for determining the running irregularity values RI_cyl(x) of the individual cylinders cyl(x). The fct_RI function is based on the evaluation of the segment time periods assigned to the individual cylinders cyl(x). A segment time period correlates with a crankshaft angle range which is assigned to the respective cylinder cyl(x) and the crankshaft angle of which is dependent on the number of cylinders and on the type of internal combustion engine ICE. The crankshaft angle range corresponds, in the case of a four-stroke internal combustion engine ICE with 4 cylinders, to 720° CA/4=180° CA.

The running irregularity values RI_cyl(x) may, for example, be determined in a manner dependent on a deviation of the segment time period assigned to the respective cylinder cyl(x) from an average segment time period. Methods for determining such running irregularity values RI_cyl(x), which are then used as a basis for the misfire identification, are described for example in EP 0 583 496 B1, EP 0

576 705 B1 and DE 10 2005 046 956 B3, the content of which is hereby correspondingly incorporated herein in this regard.

In a step S7, the running irregularity value RI_cyl(x−1) of the cylinder cyl(x−1) is compared with a predefined threshold value RI_cyl_TV. The letter x denotes a running variable for the individual cylinders, wherein cyl(x−1) denotes the cylinder which precedes the cylinder cyl(x) in time in the ignition sequence.

If the running irregularity value RI_cyl(x−1) of the cylinder cyl(x−1) lies below the threshold value RI_cyl_TV for a predefined number of cycles y, that is to say a relative drop in the running irregularity values RI_cyl(x−1) of the cylinder cyl(x−1) occurs for the number y of cycles, then in a step S8, a marker is placed which indicates a suspicion of spontaneous ignition for the cylinder cyl(x). An occurrence of a spontaneous ignition of the cylinder cyl(x) is thus not directly inferred, it rather being the case that, in the next steps, a differentiation is performed as regards whether a deceleration of the crankshaft drive caused by too early a combustion in the next cylinder cyl(x) owing to a spontaneous ignition or a deceleration of the crank drive owing to a misfire of the combustion presently under consideration in the cylinder cyl(x−1) is involved.

To be able to make this distinction, in a step S9, the fuel injection of the cylinder cyl(x) suspected of spontaneous ignition is suppressed for a predefined number of cycles z, that is to say the fuel supply to the cylinder cyl(x) is interrupted.

In a subsequent step S10, the running irregularity values RI_cyl(x−1) of the cylinder cyl(x−1) are detected again and it is checked whether these have changed in relation to the values detected in step S6. If the result of the measure of the fuel suppression for the cylinder cyl(x) in step S9 is a disappearance of the influence on the running irregularity values RI_cyl(x−1) of the cylinder cyl(x−1) for the number of cycles z, then in a subsequent step S11, the suspicion of spontaneous ignition for the cylinder cyl(x) is confirmed and, in a step S12, measures for the cylinder cyl(x) at risk are initiated. As measures, use may be made of interventions which result in a lowering of the combustion chamber temperature. For example, a rich air-fuel mixture may be set in order to realize cooling within the combustion chamber. A reduction of the load, for example through at least partial closure of the throttle flap, selective deactivation of the fuel supply to the cylinder cyl(x) or opening of a wastegate in the case of a supercharged internal combustion engine, likewise leads to a reduction of the temperature in the combustion chamber. After implementation of these temperature-lowering interventions, the method is ended in a step S13.

If the result of the measure of the suppression of injection for the cylinder cyl(x) in step S9 is a lowering of the running irregularity value of the cylinder cyl(x), and the influence on the running irregularity of the cylinder cyl(x−1) remains constantly present for the number of cycles z, then a misfire or a low-torque combustion in the combustion chamber of the cylinder cyl(x−1) is involved, which has falsely led to a suspicion of spontaneous ignition of the cylinder cyl(x) in step S8. Therefore, in a step S14, the suspicion of spontaneous ignition for the cylinder cyl(x) is rejected. The method begins again from the outset, possibly after the expiry of an applicable delay time T_DELA (step S17).

During the injection suppression for the cylinder cyl(x), the function for misfire identification fct_RI for the cylinder cyl(x) must be suppressed. Owing to only a small number of cycles z of injection suppression for the individual cylinder cyl(x), the torque influence noticeable to the driver of the vehicle driven using the internal combustion engine ICE remains within limits.

The misfire identification function fct_RI however makes it possible to identify a misfire of the cylinder cyl(x−1) even during active injection suppression for the cylinder cyl(x). Therefore, in a refinement of the method, the step S14 may be followed by steps S15 and S16 (shown by dashed lines) in which misfire identification is performed in accordance with a method which evaluates running irregularity values for the cylinder cyl(x−1), and if necessary, corresponding measures can be initiated for the cylinder cyl(x−1).

Embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

LIST OF REFERENCE DESIGNATIONS

1 Intake tract
11 Throttle flap
13 Intake pipe, inlet duct
14 Air mass sensor
15 Temperature sensor for intake air
16 Intake pipe pressure sensor
17 Throttle flap position sensor
2 Engine block
21 Crankshaft
22 Crankshaft angle sensor
23 Oil temperature sensor
24 Piston
25 Connecting rod
26 Coolant temperature sensor
27 Combustion chamber
3 Cylinder head
30 Gas inlet valve
31 Gas outlet valve
34 Injection valve
35 Ignition plug
4 Exhaust-gas tract
40 Exhaust-gas catalytic converter
41 Exhaust-gas probe
6 Control device
61 Computing unit, processor
62 Program memory
63 Value memory, data memory
ICE Internal combustion engine
fct_RI Function for the identification of misfires
fct_SI Function for the identification of spontaneous ignitions
CA Crankshaft angle in degrees
CA_EVW Evaluation window for spontaneous ignition identification
RI_cyl(x) Running irregularity value of the cylinder x
RI_cyl_TV Threshold value for running irregularity value
N Engine speed
n_cycl Number of combustion cycles
p_cyl Combustion chamber pressure
p_cyl_reg Combustion chamber pressure profile during regular combustion
p_cyl_SI Combustion chamber pressure profile during spontaneous ignition S1-S17 Method step
TCO Coolant temperature
TOIL Oil temperature
T_WAIT Waiting time period
T_DELA Delay time
x Running variable of cylinder
y Number of cycles for undershooting the running irregularity value
z Number of cycles for injection suppression
ITDC Ignition top dead center
cyl(x) cylinder
IGT Ignition time

We claim:

1. A method for identifying a spontaneous ignition in an applied-ignition internal combustion engine with multiple cylinders, comprising:
measuring successive segment time periods which are assigned to the individual cylinders and which are required by the crankshaft to pass through predefined angle ranges during the working strokes of the cylinders,
subsequently determining running irregularity values from the segment time periods,
in a predefined load/engine speed range of the internal combustion engine, comparing the running irregularity values of all of the cylinders with a predefined threshold value,
identifying a suspicion of spontaneous ignition for a first cylinder of the multiple cylinders if the running irregularity value of a second cylinder which precedes the first cylinder in time in the ignition sequence falls below the threshold value,
interrupting a fuel supply to the first cylinder suspected of spontaneous ignition for a predefined number of cycles,
detecting an influence of the interruption of fuel to the first cylinder on the running irregularity values of the second cylinder during the cycles, and
confirming or rejecting the suspicion of spontaneous ignition for the first cylinder depending on occurring running irregularity values of the second cylinder.

2. The method as claimed in claim 1, wherein the suspicion of spontaneous ignition for the first cylinder is rejected and a misfire or a low-torque combustion in the combustion chamber of the second cylinder is identified if, as a result of interrupting the fuel supply to the first cylinder, a decrease in the running irregularity value of the first cylinder occurs and the influence on the running irregularity of the second cylinder remains present for the number of cycles.

3. The method as claimed in claim 1, wherein the suspicion of spontaneous ignition for the first cylinder is confirmed if, as a result of interrupting the fuel supply to the first cylinder, the influence on the running irregularity values of the second cylinder disappears for the number of cycles.

4. The method as claimed in claim 3, further comprising, following confirmation of the suspicion of spontaneous ignition for the first cylinder, initiating measures for lowering the combustion chamber temperature of the first cylinder.

5. The method as claimed in claim 4, wherein initiating measures for lowering the combustion chamber temperature of the first cylinder comprises at least one of:
setting a rich air-fuel mixture,
reducing a load of the internal combustion engine,
at least partially closing a throttle flap arranged in an intake tract of the internal combustion engine,
selectively deactivating the fuel supply to the first cylinder, and
opening a wastegate in the case of a supercharged internal combustion engine.

6. The method as claimed in claim 1, further comprising, during the interruption of the fuel supply to the first cylinder, suppressing a function for misfire identification, which is based on an evaluation of the running irregularity values, for the first cylinder.

7. An engine control unit for an internal combustion engine for identifying a spontaneous ignition in the internal combustion engine, the internal combustion engine including a plurality of cylinders and a crankshaft coupled to each cylinder, and the engine control unit comprising a processor and memory coupled thereto, the memory having stored therein at least one program executable by the processor for configuring the engine control unit to:
measure successive segment time periods which are assigned to the individual cylinders and which are required by the crankshaft to pass through predefined angle ranges during working strokes of the cylinders,
subsequently determine running irregularity values from the segment time periods,
in a predefined load/engine speed range of the internal combustion engine, compare the running irregularity values of all of the cylinders with a predefined threshold value,
identify a suspicion of spontaneous ignition for a first cylinder of the plurality of cylinders if the running irregularity value of a second cylinder which precedes the first cylinder in time in an ignition sequence falls below the predefined threshold value,
interrupt a fuel supply to the first cylinder suspected of spontaneous ignition for a predefined number of cycles,
detect an influence of the interruption of the fuel supply to the first cylinder on the running irregularity values of the second cylinder during the cycles, and
confirm or reject the suspicion of spontaneous ignition for the first cylinder depending on occurring running irregularity values of the second cylinder.

8. The engine control unit of claim 7, wherein the suspicion of spontaneous ignition for the first cylinder is rejected and a misfire or a low-torque combustion in the combustion chamber of the second cylinder is identified if, as a result of interrupting the fuel supply to the first cylinder, a decrease in the running irregularity value of the first cylinder occurs and the influence on the running irregularity of the second cylinder remains present for the number of cycles.

9. The engine control unit of claim 7, wherein the suspicion of spontaneous ignition for the first cylinder is confirmed if, as a result of interrupting the fuel supply to the first cylinder, the influence on the running irregularity values of the second cylinder disappears for the number of cycles.

10. The engine control unit of claim 9, further comprising, following confirmation of the suspicion of spontaneous ignition for the first cylinder, initiating measures for lowering the combustion chamber temperature of the first cylinder.

11. The engine control unit of claim 10, wherein initiating measures for lowering the combustion chamber temperature comprises at least one:
setting a rich air-fuel mixture,
reducing a load of the internal combustion engine,
at least partially closing a throttle flap arranged in an intake tract of the internal combustion engine,
selectively deactivating the fuel supply to the first cylinder, and
opening a wastegate in the case of a supercharged internal combustion engine.

12. The engine control unit of claim 7, further comprising, during the interruption of the fuel supply to the first cylinder, suppressing a function for misfire identification, which is based on an evaluation of the running irregularity values, for the first cylinder.

13. The method of claim 1, wherein confirming or rejecting the suspicion of spontaneous ignition for the first cylinder comprises one of confirming and rejecting the suspicion of spontaneous ignition for the first cylinder depending on occurring running irregularity values of the second cylinder during the cycles.

14. The engine control unit of claim 7, wherein the engine control unit is configured to perform one of confirming and rejecting the suspicion of spontaneous ignition for the first cylinder depending on occurring running irregularity values of the second cylinder during the cycles.

\* \* \* \* \*